Figure 1:
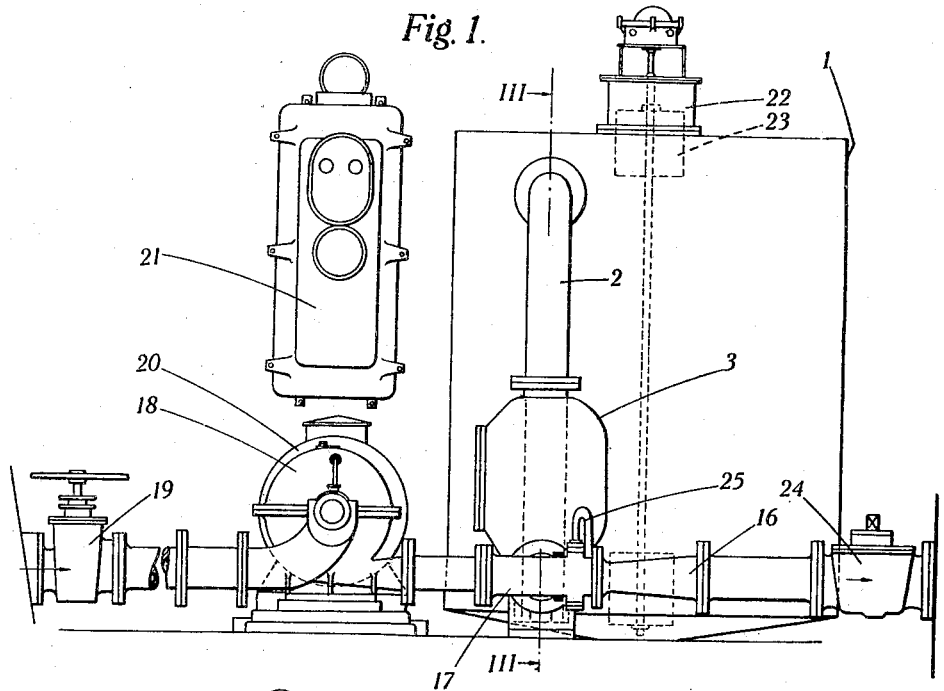

June 20, 1939.　　　　　J. F. TUCKER　　　　　2,163,506

SHIP'S SEWAGE DISPOSAL APPARATUS

Filed Sept. 28, 1938　　　2 Sheets-Sheet 1

Inventor
Joseph F. Tucker
by
Sommers & Young
Attorneys

June 20, 1939.  J. F. TUCKER  2,163,506

SHIP'S SEWAGE DISPOSAL APPARATUS

Filed Sept. 28, 1938  2 Sheets-Sheet 2

Inventor
Joseph F. Tucker
by Sommers & Young
Attorneys

Patented June 20, 1939

2,163,506

UNITED STATES PATENT OFFICE 2,163,506

SHIP'S SEWAGE DISPOSAL APPARATUS

Joseph Francis Tucker, Petts Wood, England, assignor to J. Stone & Company, Limited, Deptford, England, a company of Great Britain Application September 28, 1938, Serial No. 232,215
In Great Britain June 8, 1937

3 Claims. (Cl. 103—262)

This invention concerns improvements relating to the disposal of sewage and like refuse from ships. It is concerned, moreover, with disposal apparatus of the kind wherein sewage is periodically withdrawn from a tank past a non-return valve by the action of an ejector and is discharged outside the ship below the water line. The advantages of such apparatus over apparatus in which sewage is simply discharged by gravity above the water line are well known.

According to the present invention, in apparatus of the kind set forth, the non-return valve comprises a vertically guided float valve which is arranged to be assisted in its opening by being drawn down from its seating by a suction effect transmitted from the ejector independently of the suction effect which brings about the withdrawal of the sewage from the tank.

With the arrangement according to the invention, the non-return valve will continue to operate due to its floating property even if the effect thereon of the independently transmitted suction and back pressure fails for any reason, say due to choking. Moreover, the valve may be made with relatively small pressure areas and of light construction so that it will have a low inertia and the danger of damage to the valve and its seating will be minimized. Finally, in normal operation, the valve will open and close promptly and definitely under all conditions and not only when a very heavy flow is passing. The valve will come properly clear of its seating and will not dither against the same during the whole time flow is taking place, which is liable to give rise to choking.

In a preferred and simple arrangement, the float is of annular shape and the suction is transmitted through a tube, upon which the float is guided, to a central space therein. The valve-body proper comprises a shallow dome-shaped head-portion of rubber mounted on the top of the float. Preferably means is also provided upon the base of the float for effecting a seal around the guide-tube when the float is in its lowermost position. By this means, the danger of the freedom of movement of the valve being impaired by soil drawn into the valve-guiding means is obviated or materially reduced.

Figure 2:
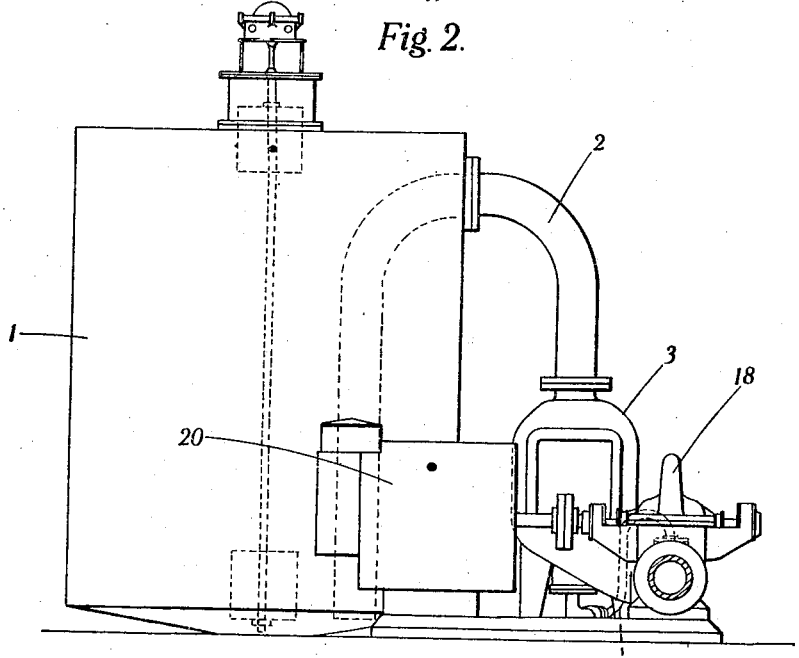
Figure 3:
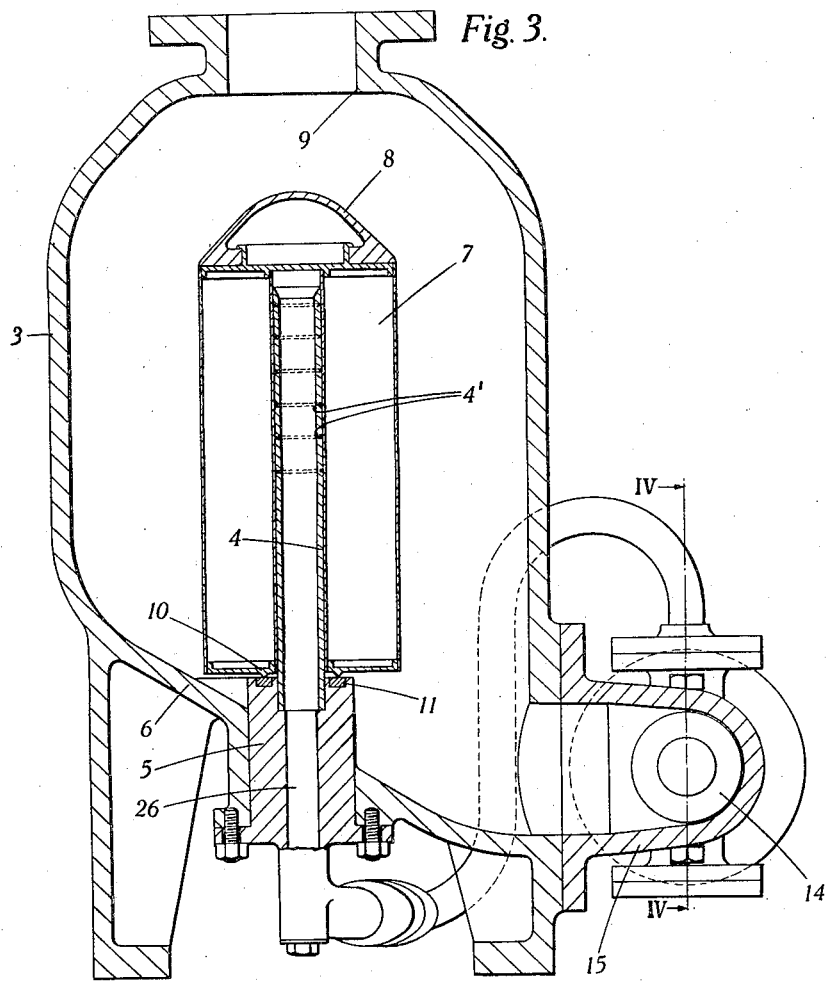
Figure 4:
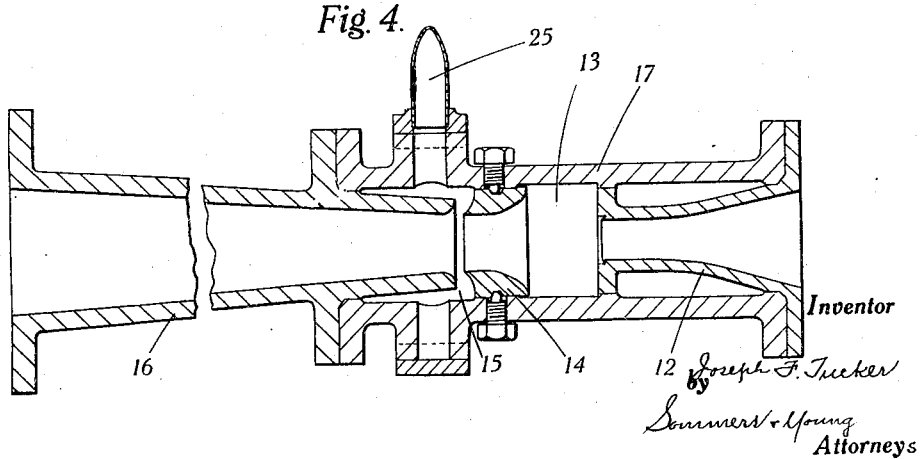

An embodiment of the invention will now be described by way of example and with reference to the accompanying drawings, in which:

Figure 1 is a front elevation of the apparatus,
Figure 2 a side elevation,
Figure 3 a vertical section to a larger scale on the line III—III in Figure 1, and Figure 4 a longitudinal section on the line IV—IV in Figure 3.

A main sewage tank 1 (Figures 1 and 2) to which various sewage pipes (not shown) discharge by gravity is arranged below water level, usually at the bottom of the ship. An inverted U-pipe 2 extends upwardly from a point near the bottom of the tank, through a side wall thereof at a point near the top and downwardly to an opening at the upper end of a float chamber 3 of substantial size. A tubular guide 4 (Figure 3) is mounted in a boss 5 in the sloping bottom 6 of the chamber 3 and extends vertically upwardly therefrom in the axis of the chamber. Slidably mounted over the tubular guide and closing the upper end thereof, is a deep annular or hollow cylindrical float 7 which carries at its upper end a moulded rubber valve-body 8 of shallow dome-shape. This valve-body co-acts with the rim 9 of the upper opening of the chamber to form a non-return valve which is closed when the float is in its uppermost position. Packing or grooves, for example packing grooves $4^1$ in the outer surface of the guide 4, may be provided between said guide and the inside of the float 7 to seal the central space within the guide and float. The base of the float has a sealing ring 10 turned on it with a sharp edge for co-acting with a resilient annular seating 11 on the aforesaid boss 5 when the float is in its lowermost position.

The hydraulic ejector (Figure 4) comprises a main converging nozzle 12 opening into a main suction chamber 13, followed by a short secondary converging nozzle 14, which opens into a subsidiary suction chamber 15, and a long diverging tube 16. The chambers 13 and 15 are formed in a housing 17 in which the nozzles 12, 14 are mounted. The wide end of the main nozzle 12 is connected to a centrifugal pump 18 adapted for drawing in sea water through a normally open valve 19 below the water line and for discharging it under high pressure through the ejector. This pump is driven by an electric motor 20 which is arranged to be set in and out of operation in per se known manner by starting switch-gear 21 (Figure 1) controlled by a switch which is housed in a casing 22 and is actuated by a float 23 responsive to the level of the sewage in the main tank 1. The diverging tube 16 is arranged to discharge the sea water and ejected sewage through a normally open valve 24 below the water-line. The main suction chamber 13 communicates directly with the lowest point of the float chamber 3 as shown in Figure 3. The subsidiary suction chamber 15 communicates, through an inverted U-pipe 25 and a bore 26 in the above-mentioned boss 5, with the interior of the tubular float-guide 4.

The manner of operation, as far as the present invention is concerned, is as follows:

When the pump and ejector are inoperative, the back pressure of the sea water in the float-chamber 3 and float-guide 4 holds the float-valve in its uppermost position with its rubber valve-body 8 hard against the opening from the main tank, thus preventing ingress of sea water to the said tank. When the pump 18 is set in operation, not only does the suction in the main chamber 13 of the ejector withdraw the sea water from the float-chamber 3 and thus allow the float to sink but also the suction in the subsidiary chamber 15 sets up a vacuum in the tubular guide 4 which will draw the float 7 downwardly. There is thus a very effective valve-opening action and the rubber valve-body 8 comes right away from its seating 9 irrespective of the rate of flow of liquid past it. Furthermore, when the rapidly sinking float 7 reaches its lowermost position, the sealing ring 10 at its base seats upon the resilient seating 11 and the float is held down by an effective suction action due to the increased area on which the suction acts. There is thus no danger of dithering of the float occurring whilst sewage is being drawn through the float chamber to the ejector. The sealing action at the base of the float has the further advantage that access of dirt to the guide is prevented.

As the pump slows down after being switched off, sea water flows back through the ejector and passes up into the tubular guide 4, forcing the float 7 upwardly. Sea water also passes up into the float-chamber 3 and thus assists or completes the rapid and definite closure of the non-return float-valve.

What I claim is:

1. In apparatus for ejecting and controlling the ejection of ship's sewage under-water, an ejector having vacuum-generating means, a casing having a top liquid inlet and a bottom outlet, means for connecting said outlet with said ejector, a vertical annular cylindrical float body in said casing and enclosing an axial tubular chamber open at the bottom, a valve formation fitted to the top of said float body and adapted for operating as a closure for said inlet, a fixed vertical hollow guide stem having a sliding fit within and opening into said axial chamber, and vacuum-connecting means supporting said stem in said casing and adapted for arresting and seating said float body at the bottom of its descent and connecting the vacuum means of said ejector with the hollow guide stem.

2. In apparatus for ejecting and controlling the ejection of ship's sewage under-water, a float casing having a top liquid inlet for the sewage to be disposed of and a bottom outlet, an ejector having vacuum-generating means, means for connecting said outlet with said ejector, a vertical annular cylindrical float body located in said float casing and enclosing an axial tubular chamber open at the bottom, a valve formation fitted to the top of said float body for operating as a closure for said inlet, a fixed vertical hollow guide stem having a sliding fit within and opening into said axial chamber, vacuum-connecting means supporting said stem in said casing, and an annular valve seating on said connecting means for sealing engagement with the float body at the bottom of its descent, said vacuum-connecting means connecting said vacuum-generating means with the tubular chamber of the float body.

3. In apparatus for ejecting ship's sewage under-water, a valve chamber having a downwardly facing valve seat, a vertically disposed annular cylindrical float body having a valve on its upper surface opposite said valve seat, said float body enclosing an axial tubular chamber open at the bottom, a fixed vertical hollow guide stem having a sliding fit within and opening into said axial chamber, an ejector normally open to thes seat for discharging sewage, a sewage discharge conduit connecting said valve chamber to the suction inlet of said ejector, said ejector having therein a zone of low pressure when operating to discharge sewage, conduit means connecting said stem with said low pressure zone of said ejector to apply suction to the tubular chamber when the ejector is in operation and sea water pressure thereto when not in operation, whereby the descent of said float body on said stem for valve opening is produced by internal suction assisted by gravity and ascent of said body for valve closure is produced by internal sea water pressure assisted by flotation.

JOSEPH FRANCIS TUCKER.

CERTIFICATE OF CORRECTION.

Patent No. 2,163,506. June 20, 1939.

JOSEPH FRANCIS TUCKER.

It is hereby certified that error appears in the printed specification of the above numbered patent requiring correction as follows: Page 2, second column, line 35, claim 3, for "thes seat" read the sea; and that the said Letters Patent should be read with this correction therein that the same may conform to the record of the case in the Patent Office.

Signed and sealed this 22nd day of August, A. D. 1939.

Leslie Frazer (Seal) Acting Commissioner of Patents.